United States Patent

[11] 3,601,445

| [72] | Inventor | Vasilios Glynias |
| | | 117 Janice Lane, Addison, Ill. 60101 |
| [21] | Appl. No. | 796,995 |
| [22] | Filed | Feb. 6, 1969 |
| [45] | Patented | Aug. 24, 1971 |

[54] HEADREST STRUCTURE FOR VEHICULAR USE
5 Claims, 4 Drawing Figs.

[52] U.S. Cl. .................................................. 297/404,
297/408, 248/118
[51] Int. Cl. ........................................................ A47c 7/36
[50] Field of Search........................................ 248/118,
206, 240.2, 263; 297/391, 405, 408, 397, 404;
294/64

[56] References Cited
UNITED STATES PATENTS

| 904,679 | 11/1908 | Bruton | 248/363 X |
| 1,399,820 | 12/1921 | Stoots | 248/240.2 |
| 1,423,855 | 7/1922 | Johnson | 248/240.2 |

FOREIGN PATENTS

| 257,703 | 9/1926 | Great Britain | 248/206 |
| 1,477,518 | 3/1967 | France | 297/391 |

*Primary Examiner*—James T. McCall
*Attorneys*—Keith J. Kulie and Donald B. Southard

ABSTRACT: An improved portable headrest structure for vehicular use is described which may be releasably attached to a window of a vehicle or the like and support a user's head positioned in a natural, sidewise-tilted manner. Effective shock absorption is obtained by a pair of soft, resilient rubber section cups intended for attachment to a vehicular surface and a spring-supported front support member together with a cushion formed of foam rubber or the like. Provision is made for quick release of the suction cups from the vehicular surface by a release valve assembly incorporated as an integral part of the suction cups.

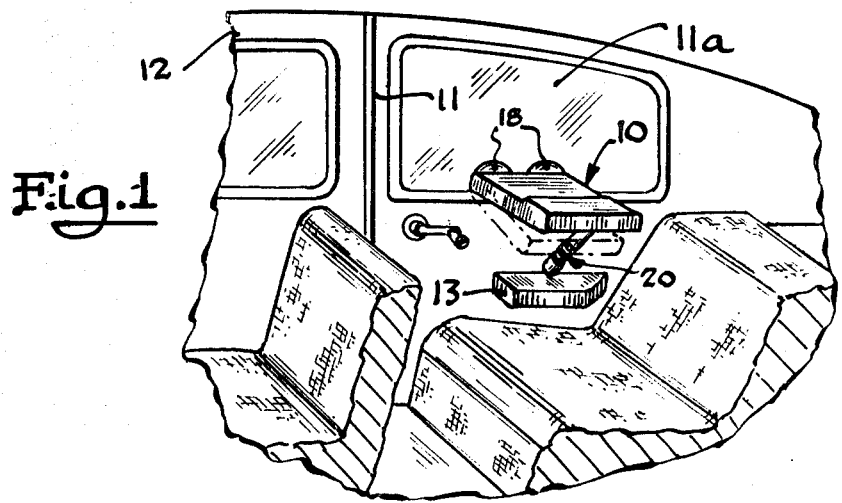
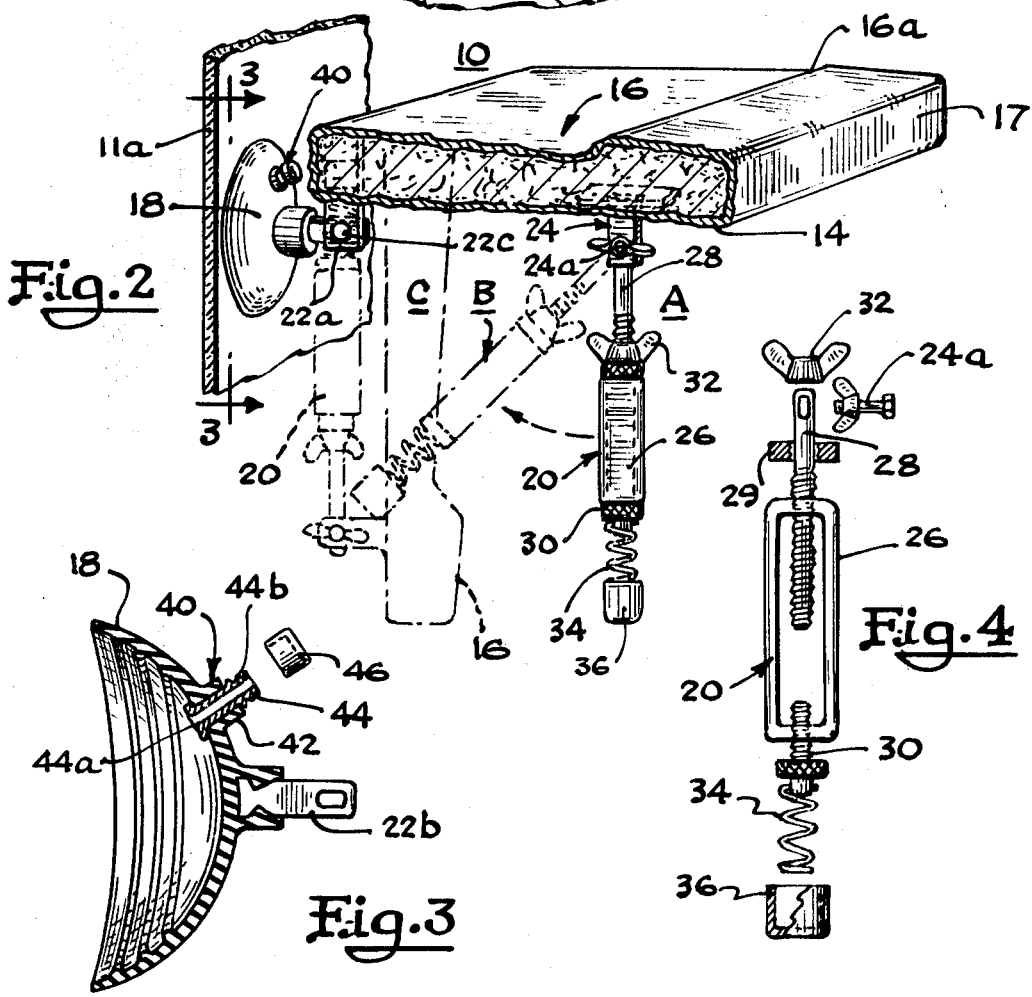
Inventor
VASILIOS GLYNIAS
By Keith J. Kulie and Donald B. Southard
Attorneys

HEADREST STRUCTURE FOR VEHICULAR USE

This invention relates in general to headrests and in particular to a headrest for an automobile, train or the like which may be attached to a window or other smooth surface of the vehicle and which may be adjusted to any desired position from an inclined to a fully horizontal plane to meet the individual preference of the user.

A passenger in an automobile, train, bus or other vehicle of transportation frequently wishes to sleep or otherwise rest comfortably while traveling to his destination. Other than lying down on the seat, he must necessarily rest in substantially a sitting position. Accordingly, the head must be supported in some manner or other. The head of course can be supported by one's hand with the elbow resting on an armrest, but this is somewhat of an unnatural position and becomes uncomfortable after a relatively short time. Thus, the only other alternative is to employ appropriate structure which will serve to support the head in an acceptable manner.

Headrests are of course known in the art and are available in various configurations, ranging from the simple pillow placed between the back of the head and the seat to a separate contoured pad or cushion adapted for attachment to the seat by brackets or the like.

All such prior art structures, however, exhibit serious disadvantages of one sort or another. Those structures which mount on the top of the seatback require the head to tilt backward. This again places the head in an unnatural position. When one relaxes while in the sitting position, the head tends to either shift forward or to the side, but not backward. Consequently, the better solution is to provide an apparatus whereby the head may be supported when moved to a sidewise position.

There are some structures known in the art which accomplishes this objective. However, the prior art structures of this type still exhibit certain undesirable characteristics. For example, some prior art structures include a pillowlike cushion which hangs from the top of the window glass or frame by a hook or bracket and an associated strap or belt. Consequently, the cushion hangs downwardly immediately adjacent the windowpane. The passenger's shoulder necessarily serves to prevent anything more than limited contact with this type of headrest. In addition, only limited support can be effected because the area of contact between the head and the cushion is relatively small. Moreover, since the headrest structure is in direct contact with the window glass or frame, vibration is readily transmitted to the person's head.

The headrest structure as disclosed herein overcomes the aforementioned disadvantages. In the preferred form, the structure includes a rigid base upon which a cushion of foam rubber is affixed. The structure includes a pair of suction cups of soft, resilient rubber or equivalent material for securely affixing the same to the vehicle window. In addition, a support leg member is provided to the front of the headrest structure, which is adjustable as to its length whereby the plane of the headrest may be inclined to any desired angle according to the individual preference of the user. The support leg is shock mounted which, in combination with the soft rubber suction cups, serves to effectively dampen out any vibration that would otherwise be transmitted to the head of the passenger. Release valves are included as an integral part of the respective suction cups to effect quick, convenient detachment of the headrest structure from the vehicular surface.

Accordingly, it is a general object of the present invention to provide an improved vibration-free headrest structure for supporting the head of a passenger in an automobile, train, bus or the like.

A more particular object of the present invention is to provide an improved headrest which may be detachably affixed to the surface of a window in a vehicle to support the head of a passenger, positioned in a sidewise, tilted manner.

Still another object of the present invention is to provide an improved headrest of the foregoing type which includes suction cups of a soft, highly resilient rubber or equivalent material for secure attachment to the surface of the vehicle window and an adjustable support member whereby the plane of the headrest may be inclined at any angle to the horizontal according to individual preference of the user.

Yet another object of the present invention is to provide an improved headrest of the foregoing type wherein the adjustable support member is shock mounted which, in combination with the suction cups, is effective to dampen out any vibration generated by the particular vehicle.

Another object of the present invention is to provide an improved headrest of the foregoing type wherein the resilient suction cups include a release valve assemble as an integral part of the structure for quick, easy detachment from the surface of the window or other vertical surface to which they may be initially affixed.

An additional object of the present invention is to provide an improved headrest of the foregoing type wherein the adjustable support member or leg may be rotated to a position parallel with the base of the cushion to permit the same to be folded down out of the way when not in use but still remain firmly attached to the window glass or other vehicular surface.

Yet another object of the present invention resides in the provision of a small, compact, inexpensive, yet highly effective and efficient headrest structure to comfortably and naturally support the head of a passenger in a vehicle, which headrest is so constructed and arranged to provide for economical manufacture and maximum commercial acceptance.

The novel features which are believed to be characteristic of the present invention are set forth with particularity in the appended claims. The invention itself, however, both as to its organization and as to further objects and advantages thereof will best be understood from the following description, taken in conjunction with the accompanying drawings, in which:

FIG. 1 is a fragmentary view in perspective of an interior of a motor vehicle showing a headrest structure affixed therein which has been constructed in accordance with the present invention;

FIG. 2 is a sectional view in side elevation of the headrest structure shown in FIG. 1;

FIG. 3 is an enlarged sectional view in side elevation of one of the suction cups taken along the line 3—3 of FIG. 2;

FIG. 4 is an exploded view of the support member in side elevation.

Referring now to the drawings, a headrest structure 10 is shown in perspective in FIG. 1 which has been mounted to a door 11 of a motor vehicle 12. It is to be understood that the headrest 10 is adapted to a wide variety of vehicular uses. For illustrative purposes, application to a motor vehicle has been chosen.

The headrest device 10 includes a rigid base 14 constructed of steel or plastic material. A contoured pad or cushion 16 is mounted on top of the base 14. In the preferred form, cushion 16 is formed of foam rubber, although other materials are acceptable, such as cotton batting or the like. The cushion 16 is enclosed in a suitable covering 17 such as cloth, plastic or vinyl materials.

The cushion is contoured with a slightly raised portion 16a to the front, best seen in FIG. 2, to provide improved support under the chin as well as effecting an attractive, esthetic appearance. In the preferred form, the cushion is approximately 9 inches in width, 6 inches in length, and 1-inch thick, although it is to be understood that the dimensions are in no way critical and can be varied to suit the preference of the fabricator.

The headrest 10 is supported by means of a pair of suction cups 18 and a vertical support member 20. The suction cups 18 are intended to affix the headrest 10 to the surface of a window, such as at 11a, or some other vertical surface of a vehicle, as shown in FIG. 1. The support member 20 extends downwardly and inwardly from the headrest 10 on a sidewall of a vehicle in any desired position.

As shown, the suction cups 18 are preferably affixed to the underside of the cushion base 14 by a bracket assembly 22 which comprises lever arms 22a and 22b. The lever arm 22a is affixed to the cushion base 14 by any suitable means, such as by welding. The bracket lever arm 22b may be affixed to the associated suction cup 18 such as by encapsulating a portion thereof within the body of the suction cup, best seen in FIG. 3, although other means are of course acceptable. Lever arms 22a and 22b may be secured together by suitable fastening means, such as by a nut and bolt assembly. The cushion 16 is thereby permitted to rotate about the axis of the bolt assembly 22c.

The resilient suction cups 18 are positioned so as to project outwardly from the rear of the headrest 10 (as viewed in FIG. 2) when their longitudinal axis (through lever arm 22b) is in the horizontal plane.

In like manner, the support member 20 depends from the underside of the cushion base 14. The support member is positioned to the front thereof (when viewing FIG. 2) and is placed approximately on a line intermediate the pair of resilient suction cups 18. A three-point support is thereby provided for effective support of the overall headrest structure 10. The support member 20 is suspended from the underside of the cushion base 14 by a bracket 24, affixed thereto by suitable means, such as by welding. A wingnut assembly 24a rotatably secures the support member 20 to the cushion base 14 and provides a pivoting action about the axis of the bolt 24a.

The support member 20 preferably comprises a turnbuckle 26 in which threaded bolts 28 and 30 extend from opposing ends, best seen in FIG. 4. A wingnut 32 mates with the threads of the bolt 28 and, together with the washer 29, provides a backstop for the turnbuckle 26 to maintain the desired length of the support member 20 as a whole. A spring member 34 is suitably affixed to the lower bolt 30 which includes a resilient stopper member 36, preferably formed of rubber, at its forward end.

As will be understood, the support member 20 is readily adjustable in length by virtue of the turnbuckle 26 and threaded bolt members 29 and 30. The adjustment in the length of the support member 20 as a whole is not only to accommodate various dimensions between the underside of the cushion base 14 and the surface of the vehicle's side of the vehicular wall, if no armrest, but also to obtain the desired angle to which the cushion 16 is positioned with respect to the horizontal. The latter is important in the interests of effecting the optimum in comfort and individual preference of the user.

It will be understood that an effective shock absorption action is obtained by the resilient suction cups 18 and support member 20. As mentioned previously, the respective suction cups 18 are constructed of a soft, resilient rubber material or the like. They provide an effective dampening action for the attendant vibration developed in and by the particular vehicle in much the same manner as motor mounts dampen out engine vibration in a motor vehicle. The resilient spring 34 of the support member 20 is likewise effective in vibration absorption as will be readily understood. Further isolation from vehicular vibration is provided by the foam rubber material comprising the cushion or pad 16.

It is to be further understood that the headrest 10 of the present invention is fully adjustable for adaptation to any vehicular configuration as well as to meet any user's preferences. The support member 20 is pivotable about the nut and bolt assembly 24a from a fully vertical position (as indicated at reference symbol A in FIG. 2), to any intermediate position (such as illustrated at B in FIG. 2). The length of the support member 20 is likewise adjustable in length as previously described to meet the varying configurations in different vehicles in which the headrest structure 10 may be incorporated. The adjustment in length of the support member 20 further permits the user to select the desired angle at which the pad or cushion 16 forms to the horizontal according to individual preferences.

Still another feature of the present invention is the provision for folding down the headrest 10 to a fully vertical position so as to be out of the way while still remaining affixed to the vertical surface of the particular vehicle, ready for convenient usage at any time. This folded position is indicated in phantom line at reference symbol C in FIG. 2. As illustrated, the support member 20 rotates about nut and bolt assembly 24a to a position where it is essentially parallel to the underside or base 14 of the pad 16 and then the pad is allowed to swing down about the nut and bolt assembly 22c, as indicated. The suction cups 18 remain affixed to the vehicular surface (window pane 11a in this instance). In this position, the headrest structure 10 extends in a horizontal direction no more than the width of the armrest 13 and thus in no way interferes or hinders the user, or any other passenger sitting adjacent thereto.

It is to be noted that the headrest 10 is firmly and securely attached to the vehicular surface of the associated vehicle by the suction cups 18. When placed against a smooth surface (such as the window pane 11a) and pressed forward, the air is driven out from the interior thereof and the resultant vacuum firmly secures the cups 18 to the surface. In the preferred embodiment, the diameter of the suction cups is on the order of 2 inches, thereby providing a substantial area in contact with the surface of the vehicle. In addition, the cups remain firmly attached because of the soft, resilient material comprising them. For this reason, it would be difficult, without more, to detach the suction cups 18 from the surface of the vehicle once they have become so affixed thereto.

However, this difficulty of detaching the cups 18 from a vehicular surface is effectively circumvented in the present invention by the provision of the release valve assembly 40 on each of the cups 18, best seen in FIG. 3. The valve assembly 40 includes a formed stem or channel 42 molded in the body of the cups 18. A valve stem 44 is positioned within the channel 42 and includes an opening 44a extending longitudinally in the interior thereof, providing access for the outside ambient atmosphere to the interior of the cups 18. The top of the valve stem 44 is threaded, as indicated at 44b, which mates with a threaded cap 46 received thereon. It will be seen that tightening the cap 46 on the stem 44 seals the cups 18 off from the outside atmosphere and permits the same to be firmly attached to a vehicular surface in the manner previously described. However, loosening the cap 46 sufficiently will permit the air to rush into the interior of the cups 18 and thereby provide a quick-release mechanism for detaching the cups from the surface of the vehicle to which they are attached.

While only specific and particular embodiments of the present invention have been illustrated and described herein, it will, of course, be understood that other variations and modifications may be effected without departing from the true scope and spirit of the invention. The particular construction and specific dimensions of the various component parts comprising the headrest structure and other factors may be varied to suit the convenience of the maker or user. The appended claims are intended to cover all such modifications and alternative constructions that fall within their true scope and spirit.

What is claimed is:

1. An improved portable headrest structure for releasable attachment to an interior surface of a vehicle to support a user's head, comprising in combination:

a rigid support base;

a contoured cushion of a resilient material affixed to said support base;

resilient support means rotatably affixed to a rear portion of the underside of said rigid base, which support means being adapted for releasable attachment to a vehicular surface;

a support member rotatably affixed to a front portion of the underside of said rigid base and adapted to support said cushion on another area of the vehicular surface, said support member being adjustable in length and axial alignment to accommodate varying vehicular configurations and to position said cushion at a selected angle to the horizontal;

shock absorption means to dampen out vibrations developed in and by the vehicle in which said headrest structure is so attached; and means for providing quick detachment of said headrest structure from the aforesaid vehicular surfaces.

2. An improved portable headrest structure in accordance with claim 1 wherein said resilient support means includes a pair of suction cups affixed to the underside of the rear of said base at respective positions near opposing ends of said base, said suction cups being formed of a soft, resilient rubber material.

3. An improved portable headrest structure in accordance with claim 1 wherein said adjustable support member includes an adjustable turnbuckle assembly having a resilient spring member at the forward end remote from said base.

4. An improved portable headrest structure in accordance with claim 1 wherein said shock absorption means includes the suction cups formed of soft, resilient material, the spring member of said support member and the resilient material forming said contoured cushion.

5. An improved portable headrest structure in accordance with claim 1 wherein provision is made for folding said headrest structure down out of the way while still remaining attached to the vehicular surface, which provision includes means for rotating said support member to a position substantially parallel to said cushion and means for rotating said cushion downwardly to a fully vertical position approximately parallel to the vehicular surface to which said suction cups are attached.